UNITED STATES PATENT OFFICE.

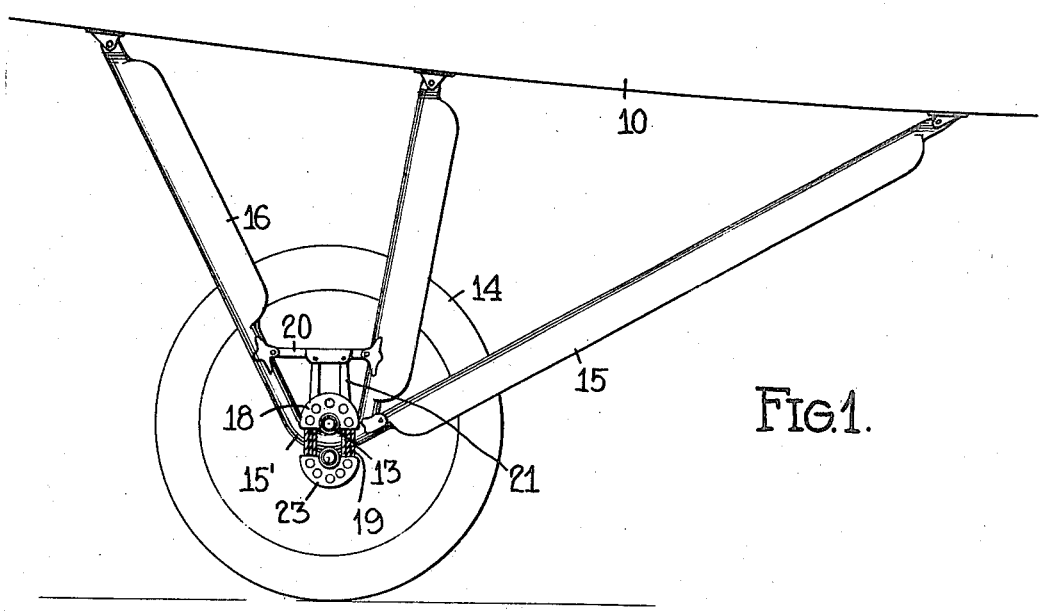
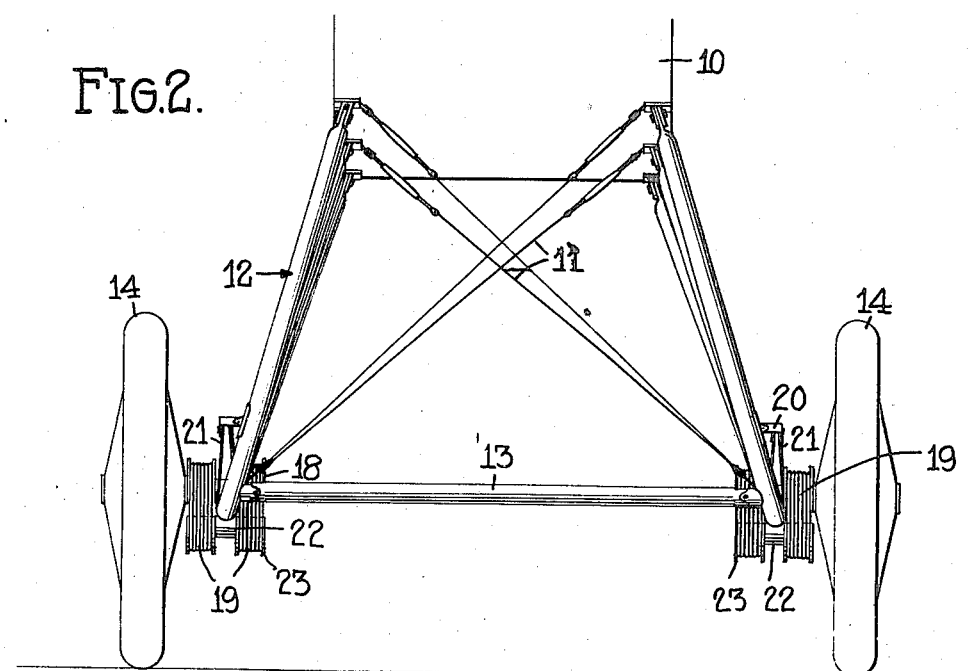

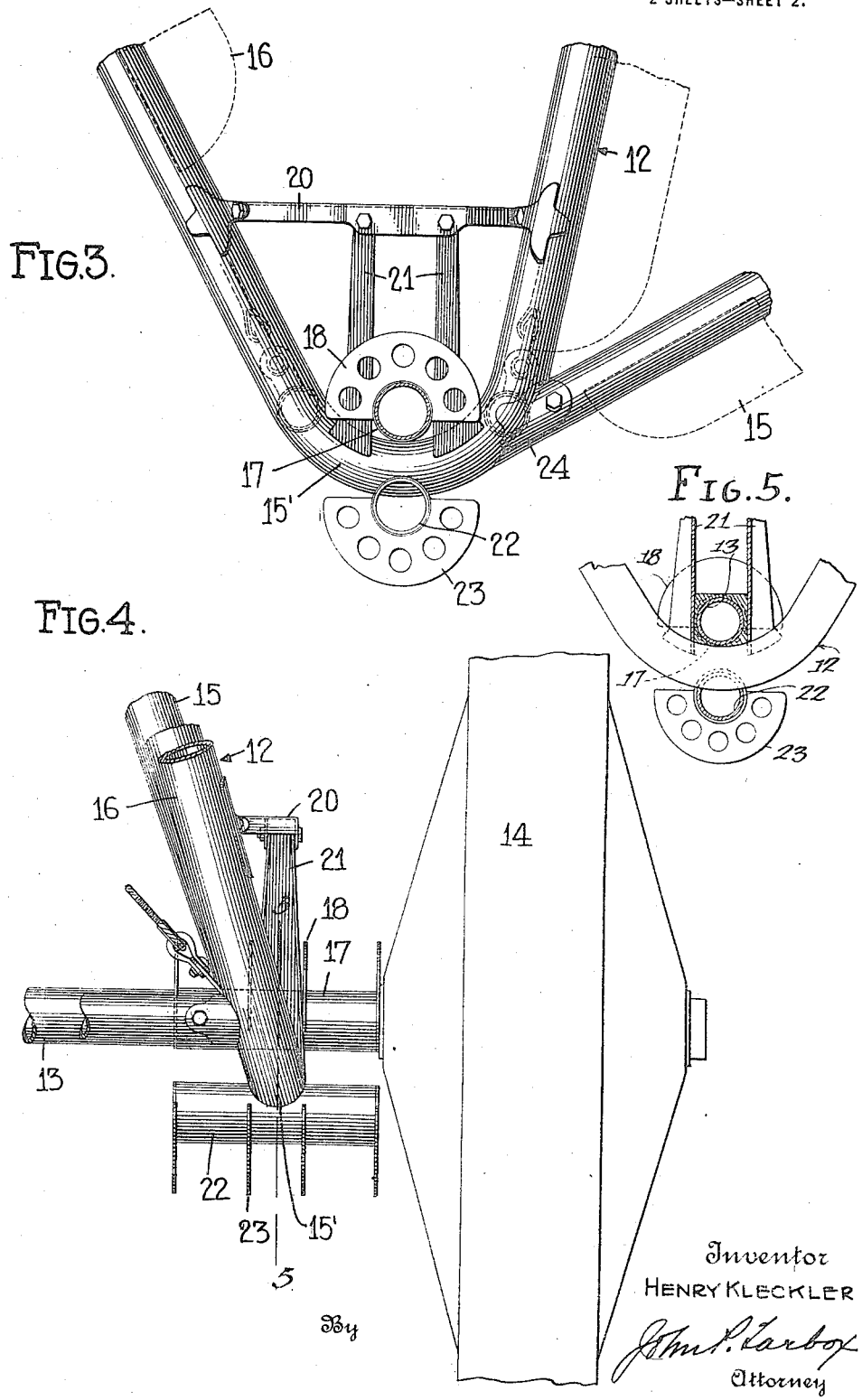

HENRY KLECKLER, OF BUFFALO, NEW YORK, ASSIGNOR TO CURTISS AEROPLANE AND MOTOR CORPORATION, A CORPORATION OF NEW YORK.

LANDING-GEAR FOR AIRCRAFT.

1,306,765.  Specification of Letters Patent.  Patented June 17, 1919.

Application filed November 16, 1917. Serial No. 202,402.

*To all whom it may concern:*

Be it known that I, HENRY KLECKLER, a citizen of the United States, residing at Buffalo, in the county of Erie and State of New York, have invented certain new and useful Improvements in Landing-Gears for Aircraft, of which the following is a specification.

My invention relates to launching and landing gear for aircraft and is characterized by improvements in the construction and relative arrangement of the various landing gear parts. The shock absorber elastics of the landing gear instead of extending transversely of the machine lie in vertical planes respectively at opposite sides of the landing gear struts and engage with corresponding spools or saddles whereby irregular torsional and twisting action and interfriction between the strands of rubber is minimized. The saddles are mounted upon the axle and at the foot of each strut in pairs. The underneath saddles are welded to the V-struts and lie in the same vertical plane as the saddles carried by the axle. Moreover, both saddles are provided with flanges for holding the elastics in place.

The invention is further characterized by an improved three-point support for the vertical guide; an improved bracing for the V-struts (braces to extend rearwardly and upwardly in the plane of the struts themselves); an improved saddle construction and mounting; and an improved fitting or rather fastening for the mentioned forwardly and downwardly inclined braces.

Of the drawings:—

Figure 1 is a longitudinal vertical sectional view of the improved launching and landing gear.

Fig. 2 is a front end elevation.

Fig. 3 is an enlarged longitudinal vertical sectional view illustrating that portion of the landing gear in the vicinity of the axle.

Fig. 4 is a front end elevation of that portion of the landing gear illustrated in Fig. 3, and Fig. 5 is a section on the line 5—5 of Fig. 4.

In Fig. 1 the fuselage or body of an airplane is designated as 10. The landing gear is fastened beneath the fuselage and transversely wired as at 11. It comprises V-struts 12, an axle 13, wheels 14, and rearwardly and upwardly inclined braces or struts 15. The V-struts 12 are formed of metal tubing intermediately bent as at 15'. The bent portion of each strut will be hereinafter designated and referred to as the bight. The legs of the V-struts connect with two forward stations of the fuselage and the braces or struts 15 with rearward stations. In this way the landing impacts are distributed over a greater area of the fuselage than heretofore. Fairing 16 is provided for each strut.

Vertical guides 21 are provided respectively adjacent the bight portions 15' of the struts. The axle lies between them and is guided in the vertical slot by bronze spools or saddles 17 which encircle the axle. The central portion of each spool is squared in cross section to give proper guidance in the vertical slots. The end portions of each spool are flanged as at 18 to accommodate shock absorber elastics 19. The vertical guides are each provided with a three point connection. This is obtained by means of an angular bridge-piece 20 for each guide connected at its ends to the front and rear legs of the V-struts. The guides themselves, designated as 21, engage respectively with the bight portions of the V-struts and the bridge-pieces 20 intermediate their ends. This arrangement is best illustrated in Fig. 3.

Beneath the bight portions of the V-struts 12 relatively fixed spools or saddles 22 are mounted. These saddles lie in the same vertical plane as the saddles 17 and are welded to the bight portions of the V-struts. They too are provided with flanges 23 which prevent displacement of the shock absorber elastics.

The elastics 19 lie in vertical planes passing over corresponding spools and saddles whereby irregular torsional and twisting action and interfriction between the strands of rubber is minimized. Since the groups of elastics are disposed respectively at opposite sides of the V-struts and are independently acting the strain upon the saddles 22 is more or less equalized.

By constructing the V-struts of metal tubing and arranging all struts to converge downwardly the strength of the landing gear is increased at the points where the greatest strains are imposed. The bight portions 15' are braced rearwardly by the struts 15 which engage at their forward ends in sockets 24 formed at the apices of the V-struts. The saddles 22 and 17 are coextensive and provided with a like number of flanges which are arranged in pairs respectively at opposite sides of the vertical guides 21. The inner flanges of the saddles 17 thus serve a two-fold purpose in that they prevent longitudinal displacement of the saddles upon the axle. Both saddles are of sleeve-form that all corners with which the elastics might engage are eliminated. Furthermore, the relative arrangement of the elastics is such that the landing strains are borne directly by the V-struts and indirectly by the struts 15. This is true because of the fact that the braces 15 engage with the V-struts at their apices and directly to the rear of the axle 13.

Obviously many modifications of the invention may be made without departing from its generic spirit. The particular manner of fastening the saddles to the V-struts and axle may be modified; also the form of saddles *per se*. No limitations are intended except in so far as the appended claims compel.

What is claimed is:

1. In a landing gear for aircraft including a substantially V-shaped strut inclined to the vertical and extended straight away from the body of the craft without a bend in the strut, an axle, an axle guide mounted at the foot of the strut, the plane of the axle guide and plane of the strut intersecting, separate groups of shock absorber elastics mounted at opposite sides of the V-strut and at opposite sides of the axle guide, the separate groups of elastics acting independently, a support for the elastics carried by the V-strut and extended beneath and across its bight portion, the elastics being laced for contact with both the support and the axle, and means on the axle and on the support for preventing displacement of the elastics.

2. A landing gear for aircraft including a substantially V-shaped strut inclined to the vertical and extended straight away from the body of the craft without a bend in the strut, an axle, an axle guide mounted at the foot of the strut, the plane of the axle guide and the plane of the strut intersecting, separate groups of shock absorber elastics mounted at opposite sides of the V-strut and at opposite sides of the axle guide, the separate groups of elastics acting independently, a support for the elastics carried by the V-strut and extended beneath and across its bight portion, the elastics being laced for contact with both the support and the axle, and a connection between the axle guide and the V-strut extended inwardly from the guide to rigidly support it in a substantially vertical position.

3. A landing gear for aircraft including a substantially V-shaped strut, an axle, an axle guide mounted at the foot of the strut, the plane of the axle guide and the plane of the strut intersecting, a saddle carried by the axle and extended across the strut to project laterally beyond its opposite faces, a saddle carried by the V-strut beneath its bight portion likewise extended across the strut to project laterally beyond its opposite faces, means on the axle for guiding it when displaced, separate groups of shock absorber elastics mounted at opposite sides of the strut and at opposite sides of the guide, the separate groups of elastics acting independently and the groups in each instance being laced for contact with both saddles, and flanges formed on the saddles to prevent displacement of the elastics, the arrangement of the flanges being such that the separate groups of elastics are held in place independently of each other.

4. A landing gear for aircraft including a substantially V-shaped strut, an axle, a substantially vertical guide for said axle, a saddle mounted upon said axle for intersection with said guide, that portion of the saddle engaging the guide being of angular cross section, a relatively fixed saddle mounted at the foot of the V-strut, and shock absorber elastics arranged for contact with both saddles to yieldingly resist displacement of said axle.

5. A landing gear for aircraft including a V-strut, an axle, a saddle constructed in sleeve-form mounted upon said axle, a portion of the saddle intermediate its ends having an angular cross section, a guide for the axle arranged for contact with said angular portion, flanges formed upon the saddle at opposite sides of the guide and at the ends of the saddle, and separate groups of shock absorber elastics engaging pairs of flanges at opposite sides of the guide.

In testimony whereof I hereunto affix my signature.

HENRY KLECKLER.